United States Patent

[11] 3,634,708

| | | |
|---|---|---|
| [72] | Inventor | Gene Alan Fisher<br>Boulder, Colo. |
| [21] | Appl. No. | 33,997 |
| [22] | Filed | May 4, 1970 |
| [45] | Patented | Jan. 11, 1972 |
| [73] | Assignee | International Business Machines<br>Corporation<br>Armonk, N.Y. |

[54] IMPROVED LOW INERTIA ARMATURE WINDING FORMED OF A CONTINUOUS WIRE
3 Claims, 7 Drawing Figs.

[52] U.S. Cl. .................................................. 310/195, 310/265
[51] Int. Cl. ..................................................... H02k 3/00
[50] Field of Search ........................................... 310/266, 162, 198, 206, 268, 264, 195, 177, 265

[56] References Cited
UNITED STATES PATENTS

| 3,209,187 | 9/1965 | Angele ......................... | 310/266 |
| 3,312,846 | 4/1967 | Henry-Baudot ............... | 310/266 |
| 3,335,309 | 8/1967 | Hansen ......................... | 310/266 |
| 3,356,877 | 12/1967 | Burr ............................. | 310/266 |
| 3,382,570 | 5/1968 | Knapp .......................... | 310/268 |
| 3,500,095 | 3/1970 | Keogh .......................... | 310/268 |

*Primary Examiner*—J. D. Miller
*Assistant Examiner*—R. Skudy
*Attorneys*—Hanifin and Jancin and Francis A. Sirr ABSTRACT: An armature, for use in a direct current machine, having a winding thereon formed so as to facilitate commutation directly on the crossover portion of the winding conductors. In the active area of the armature, where the armature winding cooperates with the magnetic field of the machine, the armature winding is formed of parallel, side-by-side, conductors which longitudinally abut to occupy a single-wire-thickness plane. At each end of this plane, alternate conductors of the single plane incline in opposite directions and cross over each other to form two contiguous single-wire-thickness planes, one plane of which is a continuation of the plane of the active area of the armature. The conductors in this crossover region are inclined at an angle of approximately 60° so that, within each of the two contiguous planes, the conductors longitudinally abut. Commutation occurs on the crossover region, where brushes cooperate with the conductors in one of the two contiguous planes. The armature winding can be formed by utilizing printed circuit techniques with discrete bridging conductors joined to the printed circuit conductors, by utilizing discrete conductors which are jointed one to the other, or by utilizing a continuous conductor wire element having no joints.

PATENTED JAN 11 1972

INVENTOR
GENE A. FISHER

BY

ATTORNEY

IMPROVED LOW INERTIA ARMATURE WINDING FORMED OF A CONTINUOUS WIRE

BACKGROUND AND SUMMARY OF THE INVENTION

The present invention relates to the art of low inertia armatures of the planar and tubular type. Such armatures must be constructed to have low mass and yet must have the strength to withstand the forces associated with use in electric machines.

The active portion of the armature winding can be defined as that portion of the winding wherein conductors cooperate with the magnetic field of the machine.

In the case of a direct current machine, the winding at each end of its active portion has crossover portions where the winding conductors cross over one another to form the well-known lap or wave winding configuration.

The physical size and efficiency of the machine is controlled by characteristics including the size of the air gap through which the active portion of the armature winding passes, and the volume of winding conductor which is placed in the active portion.

Prior art armatures of this type have been constructed in planar and tubular shape, utilizing techniques such as printed circuit techniques to form a two thickness armature winding wherein commutation occurs at either a separate commutator or directly on the conductors within the crossover portion of the winding. Prior art devices also provide structures in which preformed conductors form an armature winding which occupies a single layer of conductors in the active portion, and are then connected to a conventional commutator associated with one end of the armature.

The present invention provides an armature wherein the winding is formed of a continuous uniform cross-sectional wire member and includes a single conductor thickness in the active portion of the armature, such that the conductor cross-sectional area can be selected to provide an optimum relationship of active conductor volume and air gap size. The individual conductors within this active portion longitudinally abut, being separated only by an insulation coating, such that the active portion is substantially a solid surface of conductors. At each end of the active portion, alternate conductors are inclined in opposite directions and cross over each other to advance the winding. Preferably the conductors in the crossover portion are inclined at an angle of approximately 60° to the conductors in the active portion of the winding. With such a construction, the conductors have the same cross-sectional dimension in both the active portion and the crossover portion, and the length of conductor in the crossover portion is reduced to a minimum. Furthermore, the alternate conductors, as they extend into the crossover portion, occupying two contiguous planes, one plane of which is a continuation of the single wire thickness plane of the active portion of the winding. Within each of the planes, the conductors longitudinally abut, to produce two abutting, substantially solid surfaces of conductors. Commutation can be provided in the crossover portion of the armature since the conductors in each of the two contiguous planes longitudinally abut and are extensions of alternate conductors of the active portion of the armature winding.

The invention utilizes a continuous wire which is preformed into a coil wherein the windings are stacked one upon the other, the stack then being stretched out to form a lap winding, this structure providing a winding with a minimum number of joints.

DESCRIPTION OF THE PREFERRED EMBODIMENTS

Figure 1:
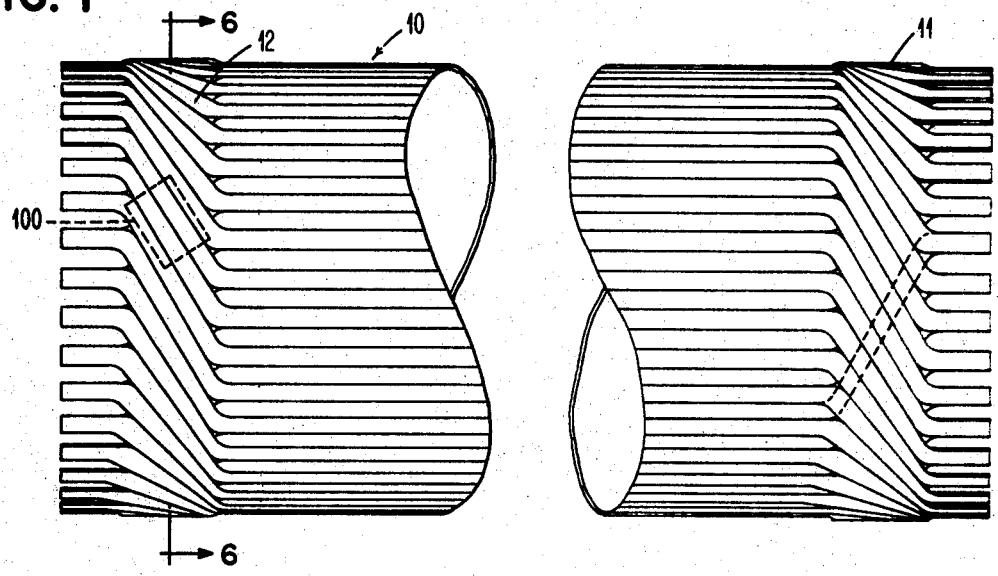
FIG. 1 is a perspective view of a tubular armature and winding constructed in accordance with the teachings of the invention.

FIG. 1 is a perspective view of a tubular armature 10 constructed in accordance with the teachings of the present invention. The major central portion of the winding is the active portion, that is, this portion of the winding cooperates with the magnetic field structure of an associated electric machine, not shown. Each end of the armature terminates in what can be called a crossover portion, generally identified by reference numerals 11 and 12. As will be apparent from the following description, the present invention provides an armature having a winding thereon, the winding being formed so as to facilitate commutation directly on the crossover 11 or 12 of the winding conductors. Furthermore, the active area of the armature, where the armature winding cooperates with the magnetic field of the machine, is composed of parallel, side-by-side conductors which longitudinally abut to occupy a single wire thickness plane. At each end of this plane, the alternate conductors of the single-wire-thickness plane incline in opposite directions and cross over each other to form two contiguous single-wire-thickness planes, one plane of which is a continuation of the plane of the active portion of the armature. Furthermore, the conductors in this crossover region are inclined in an angle of approximately 60° so that, within each of the two contiguous planes of the crossover portion, the conductors longitudinally abut. Thus, commutation may take place in the crossover region where the brushes, such as 100, cooperate only with alternate conductors of the active position of the armature winding, the brushes generally spanning a number of conductors.

Figure 2:
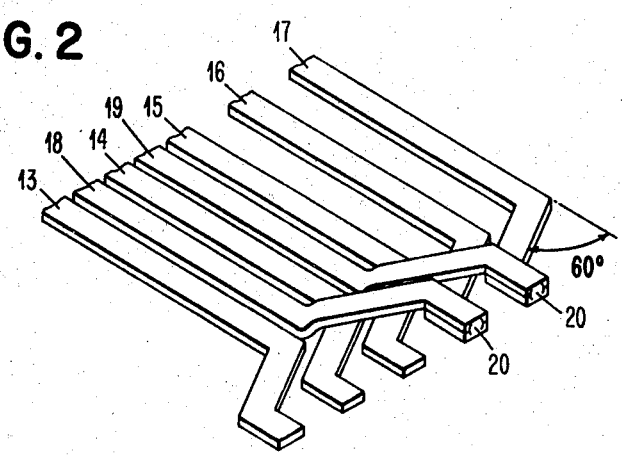
FIG. 2 is an enlarged view of a portion of a flat planar winding, which can also be formed as a tube of the type shown in FIG. 1, wherein the winding is formed of individual, preformed, discrete wires.

The teachings of the present invention can be utilized to construct either a tubular armature, such as shown in FIG. 1, or to construct a flat planer armature, a portion of which is shown in FIG. 2. In this figure, the armature winding is constructed by utilizing discrete conductors which are joined one to the other, as at 20. In this figure, discrete conductors 13, 14, 15, 16, and 17 can be defined as first conductor segments. Alternating with the first conductor segments are second conductor segments, two of which, 18 and 19, are shown. Thus it can be seen that the first conductor segment 17 of the active portion of the armature winding extends to the crossover portion and then advances as it inclines at an angle of approximately 60° to the portion of the conductor which is in the active portion of the winding. Second conductor 19 has its end portion bent to a second displaced plane which is contiguous with the plane of the inclined portions of the first conductor 17, and which is oppositely inclined at an angle of approximately 60° to the active portion of conductor 19. Conductors 17 and 19 are then joined at 20, as by welding.

From this figure, it can be seen that the active portion of all of the conductors lie in a plane defined by conductors 13–19. The first conductors 13–17 extend from this plane into a first plane of the crossover portion of the armature, this first plane being a continuation of the single-wire-thickness plane of the active portion of the armature. The second conductors 18–19 are bent out of this plane and occupy a second contiguous plane in the crossover portion of the armature. By selecting the above-mentioned angle of inclination as 60°, all wire segments may be formed of conventional flat wire stock having continuously uniform cross-sectional dimensions. This critical angle of inclination in the crossover portion of the armature provides a minimum length of armature winding in the crossover portion. Thus, the mass of the armature is reduced and the electrical resistance presented by this inactive portion of the armature winding is reduced to a minimum. For a given physical size of armature, machine magnetic field structure, and coil resistance, the present invention provides lower inertia and higher torque than possible with prior art structure.

By way of example, the flat wire stock utilized to form an armature winding such as shown in FIG. 2, may be copper having a 6 mil. thickness, a 25 mil. width and a 1 mil. coating of insulation. In FIG. 2, the conductors are shown with spaces there between. In actual practice, the conductors of the various planes longitudinally abut to form a substantially solid cylinder of metal separated by the 1 mil. layer of insulation on each conductor.

Figure 7:
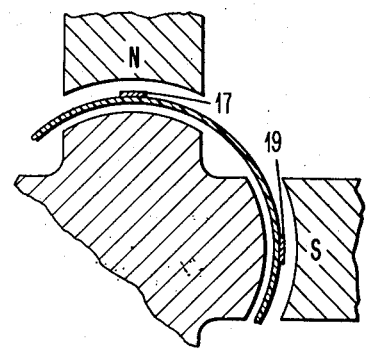
FIG. 7 is a partial cross section of an armature and an associated machine magnet structure, showing one winding turn of the single thickness active portion of the winding of FIG. 1.

Referring to FIG. 7, this figure shows the active portion of the two conductors 17 and 19 and their one-pole span, as related to the magnetic structure of a four pole machine.

Figure 3:
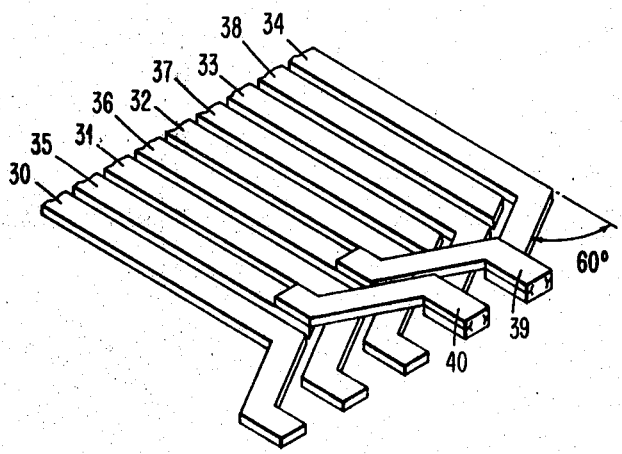
FIG. 3 is an enlarged view of a portion of a winding formed by printed circuit techniques wherein alternate conductors are continued by discrete bridging wires.

FIG. 3 discloses an armature wherein the winding of a singe plane is formed by printed circuit techniques, and wherein alternate conductors of the active portion of the winding are continued by discrete bridging wires. In this structure, conductors 30-34 can be identified as first conductors and conductors 35-38 can be identified as second conductors. The conductors 30-34 and only the active portion of conductors 35-38 are formed in a single plane by printed circuit techniques. The second conductors 35-38 are continued by discrete bridging wires, two of which are shown at 39 and 40. Again, the spacing of the various conductors has been exaggerated. In practice, the conductors in the various planes can be considered to longitudinally abut, recognizing that the utilization of printed circuit techniques leaves a gap between conductors such as 30 and 35 which is approximately 2½ times the thickness of the conductors. By way of example, the thickness of the conductors formed by printed circuit techniques may be approximately 3 mils., with a 42 mil. width, this resulting in an 8 mil. gap between the individual conductors. The bridging wires 39 and 40 are suitably attached, one end to the active portion of a second conductor and at the other end to the end of the incline portion of a first conductor.

Figure 4:
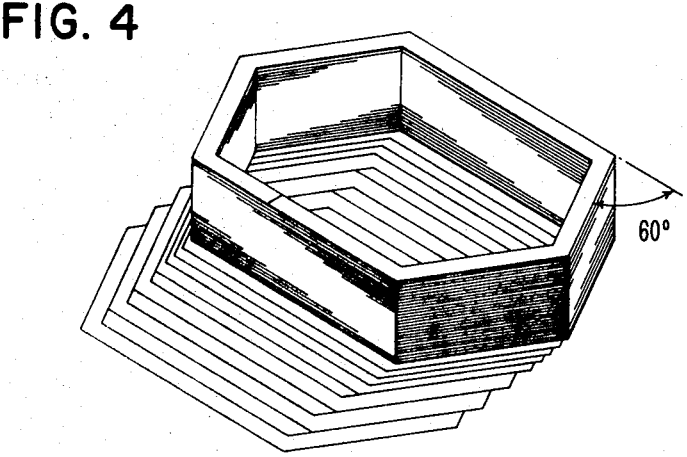
FIG. 4 is a view of a continuous wire which has been preformed into a coil having an elongated hexagonal shape, the lower windings of the coil being horizontally displaced to begin a lap type winding having the characteristics of the winding of FIG. 1.
Figure 5:
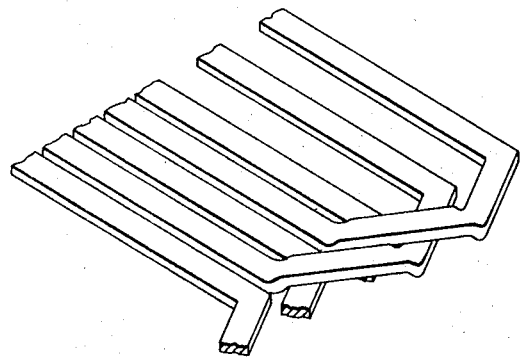
FIG. 5 is an enlarged view of a portion of the lap winding being formed in FIG. 4.

FIG. 4 shows a continuous flat wire of uniform cross section, of the type utilized in FIG. 2, wherein the continuous wire has been preformed into a coil having an elongated hexagonal shaped. The lower windings of the coil have been horizontally displaced to begin the formation of the lap-type winding having the spacial characteristics of the winding of FIG. 1. In FIG. 5, a portion of the resulting lap-type winding is disclosed and it can be seen from this figure that the unique properties of the winding, as described in connection with FIG. 2, are present, and additionally the connections 20, as by welding or the like, at the end of the armature crossover portion are eliminated. The structure of FIG. 5 may be utilized to form a tubular armature, and is of particular utility when utilized in a flat planer armature for use in a linear movement electrical machine, since such a machine requires a lap winding. Here again, the wire utilized to form the preformed coil of FIG. 4, and the armature winding of FIG. 5 may, for example, have cross-sectional dimensions of 6 mils. by 25 mils., with a 1 mil. coating of insulation to insulate adjacent conductors one from the other.

Figure 6:
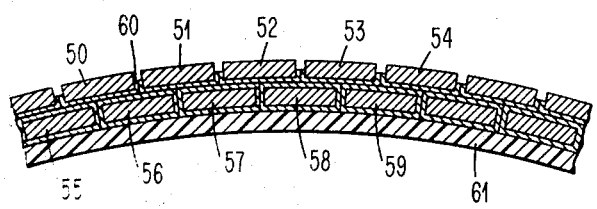
FIG. 6 is an enlarged sectional view of the commutator portion of the armature of FIG. 1, taken along the line 6—6.

FIG. 6 is an enlarged partial section view of the commutator portion of the armature of FIG. 1, showing that all of the first conductors 55-59 of the active portion of the armature occupy a first plane which is radially displaced and contiguous with the second plane defined by second conductors 50-54. In this figure, the thickness of 1 mil. insulation coating 60 has been exaggerated. The conductors 50-54 which occupy the outer plane of the crossover portion of the armature have been treated to remove the insulation and thus expose the copper for contact by brushes of the electric machine, not shown. These brushes, referring to 100 of FIG. 1, are set at an angle of approximately 60° to the axis of rotation of the armature, in alignment with the mating conductors in the crossover portion, and are of a thickness to engage more than one of the conductors 50-54 as the armature rotates.

Reference numeral 61 identifies generally a support structure which may consist of an epoxy fiberglass tube which is solid at room temperature. During manufacture, the tube is placed on a mandrel, the winding is placed on the tube and clamped in position. The structure is then heated, the epoxy becomes fluid and flows between the conductors, as shown in FIG. 6. The commutating surface is then prepared and the mandrel is removed leaving a finished armature. As was mentioned in connection with FIG. 3, printed circuit techniques leave a gap between the individual conductors. This gap is filled by the flowing epoxy during the above-mentioned manufacturing process.

While the invention has been particularly shown and described with reference to a preferred embodiment thereof, it will be understood by those skilled in the art that various changes in form and details may be made therein without departing from the spirit and scope of the invention.

What is claimed is:

1. In an armature, for use in a direct current machine, having an armature winding thereon, the improvement comprising:
    an armature lap-winding formed of a continuous wire member of uniform cross section,
    said winding having a single-wire-thickness active portion disposed in the central area of the armature, said active portion consisting of alternately spaced first and second conductors in longitudinal abutting relationship such that the active portion of said winding forms a substantially continuous metal surface whose thickness is substantially equal to the thickness of said wire member,
    said winding having a two-wire-thickness crossover portion at each end of said active portion adapted to cooperate with brush means, each of said crossover portions consisting of two abutting single-wire-thickness surfaces, one of said two surfaces containing only said first conductors and the other of said two surfaces containing only said second conductors, and the conductors of said two surfaces being oppositely inclined at an angle of approximately 60° so as to place the conductors of said two surfaces in longitudinal abutting relationship to form two substantially continuous metal surfaces, and
    insulating support means structurally supporting said armature winding.

2. An armature as defined in claim 1, wherein said armature is a tubular armature, wherein the active portion of said winding forms a substantially continuous metal cylinder, and wherein said crossover portions constitute two concentric and contiguous single-wire-thickness cylinders, one cylinder of which is a continuation of said first mentioned cylinder, the conductors of said two concentric cylinders being spiraled in opposite directions around the axis of the tubular armature.

3. An armature as defined in claim 2, wherein said continuous wire member is covered with a layer of electrical insulation, wherein said first and second conductors are positioned such that the layers of insulation longitudinally abut in said active portion and said crossover portions, and wherein said insulation is removed in an annular band within a crossover portion to expose a commutation surface.

* * * * *